Figure 1:
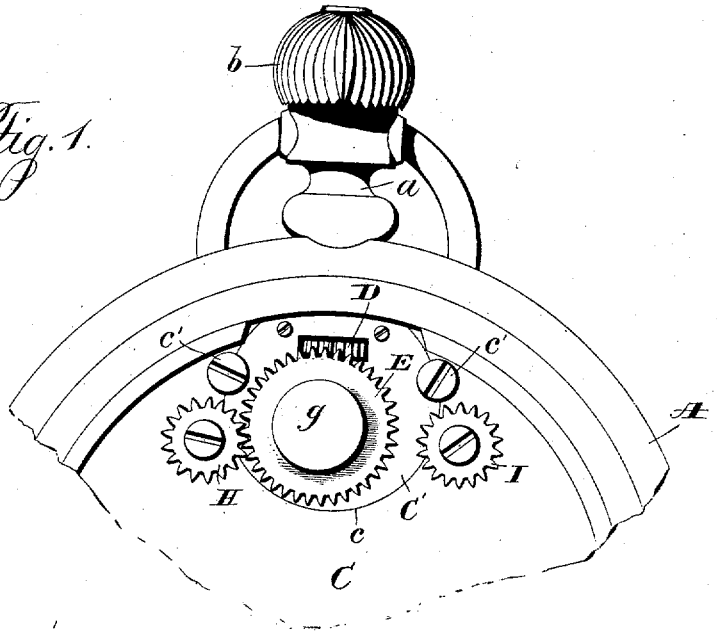

3 Sheets—Sheet 1.

E. H. FLINT.

STEM WINDING AND SETTING WATCH.

No. 11,323. Reissued Apr. 11, 1893.

Witnesses:
Jas. E. Hutchinson.
Henry C. Hazard.

Inventor.
Edwin H. Flint by
Prindle & Russell, his Attys.

THE NORRIS PETERS CO., PHOTO-LITHO., WASHINGTON, D. C.

3 Sheets—Sheet 2.

E. H. FLINT.

STEM WINDING AND SETTING WATCH.

No. 11,323. Reissued Apr. 11, 1893.

Witnesses:
Jas. E. Hutchinson.
Henry C. Hazard.

Inventor.
Edwin H. Flint, by
Prindle and Russell, his Attys.

THE NORRIS PETERS CO., PHOTO-LITHO., WASHINGTON, D. C.

E. H. FLINT.

STEM WINDING AND SETTING WATCH.

No. 11,323. Reissued Apr. 11, 1893.

Witnesses:
Jas. E. Hutchinson.
Henry C. Hazard.

Inventor.
Edwin H. Flint, by
Prindle and Russell, his Attys.

THE NORRIS PETERS CO., PHOTO-LITHO., WASHINGTON, D. C.

UNITED STATES PATENT OFFICE.

EDWIN H. FLINT, OF CINCINNATI, OHIO, ASSIGNOR TO GEORGE S. PRINDLE, OF WASHINGTON, DISTRICT OF COLUMBIA.

STEM WINDING AND SETTING WATCH.

SPECIFICATION forming part of Reissued Letters Patent No. 11,323, dated April 11, 1893.

Original No. 472,987, dated April 19, 1892. Application for reissue filed February 13, 1893. Serial No. 462,209.

*To all whom it may concern:*

Be it known that I, EDWIN H. FLINT, of Cincinnati, in the county of Hamilton, State of Ohio, have invented certain new and useful Improvements in Stem Winding and Setting Watches, for which Letters Patent of the United States No. 472,887 were issued upon the 19th day of April, 1892, which Letters Patent have been found to be inoperative and invalid and not to cover the invention set forth in the specification and shown in the drawings which were filed in the Patent Office upon the 11th day of May, 1891, preparatory to the obtaining of the said Letters Patent. Now therefore, being desirous of reissuing the said Letters Patent, I have prepared and do hereby declare the following to be a full, clear, and exact description of the said invention, reference being had to the accompanying drawings, in which—

Figure 2:
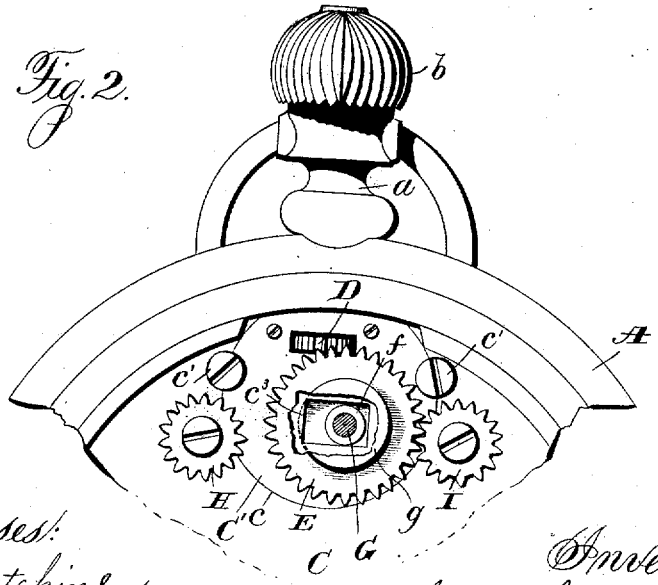
Figure 3:
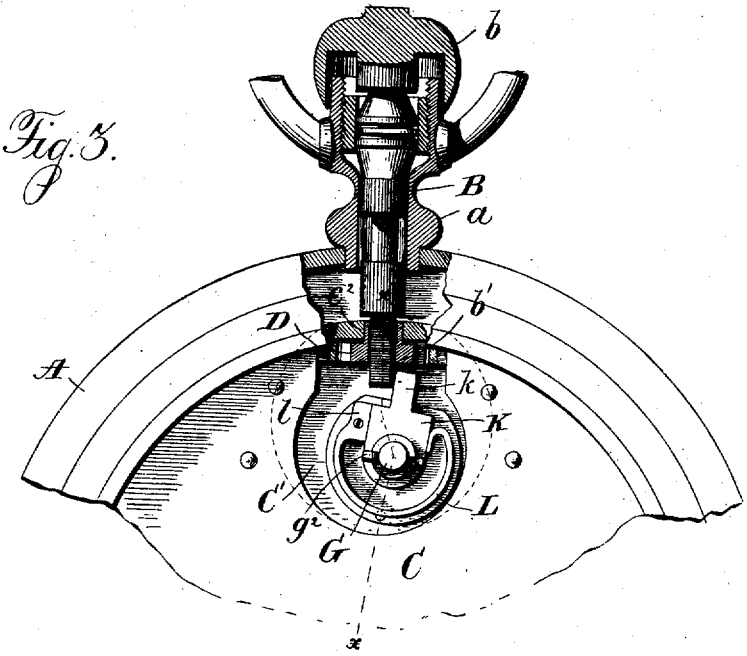
Figure 4:
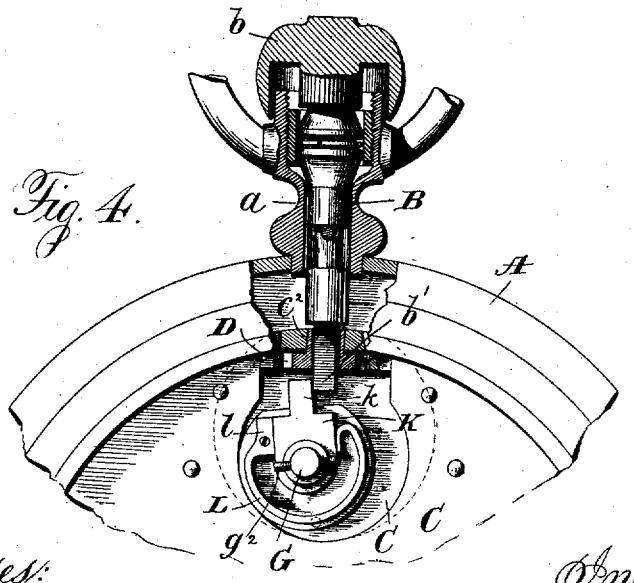
Figure 5:
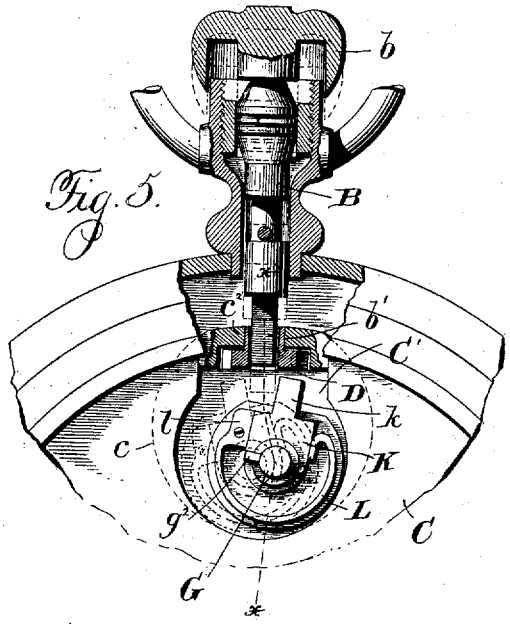
Figure 6:
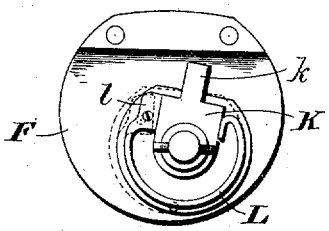
Figure 7:
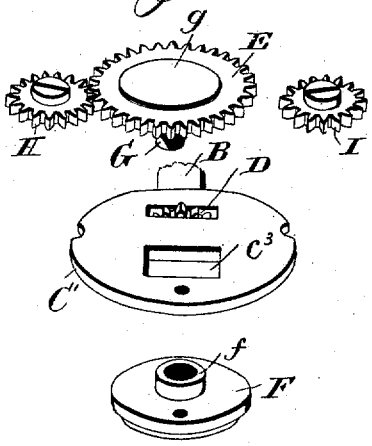
Figure 8:
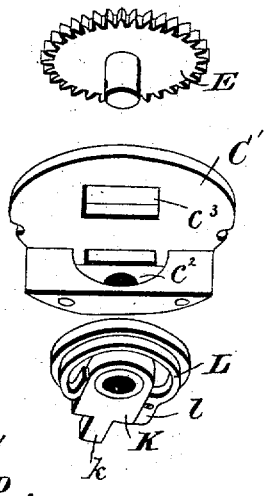
Figure 9:
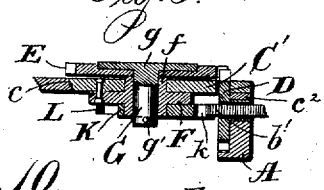
Figure 10:
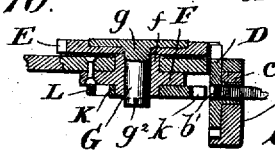

Figure 1 is a plan view, from the front side, of a watch containing my improvements, the dial being removed and the parts shown in position for winding the main spring. Fig. 2 is a like view of the same with the parts in position for setting the hands, a portion of the intermediate wheel being removed to show the plate beneath. Figs. 3 and 4, are plan views of said watch from the rear, with the back plate removed, and the stem or pendant in longitudinal section, and show, respectively, the arrangement of parts when the winding and the setting engagements are effected. Fig. 5. is a like view of the same, the full lines showing the relative positions of parts when the stem arbor has been retracted to shift the engagement from winding to setting, and the dotted lines the positions of the same after such engagement has been effected. Fig. 6, is a plan view of the swinging bearing for the intermediate wheel, and the back ratchet mechanism employed in connection therewith, the full lines showing the normal positions of the ratchet device, and the dotted lines the positions of the same when said intermediate wheel is about to trip over a tooth of the winding wheel. Figs. 7 and 8 are perspective views from opposite sides, of the parts composing the setting and winding mechanism, separated from each other, and Figs. 9 and 10 are sections upon lines $x, x$, of Figs. 3 and 5, and show, respectively, the positions of parts when in winding engagement and after the stem arbor has been retracted for changing such engagement.

Letters of like name and kind refer to like parts in each of the figures.

The design of my invention is to enable the winding and hands setting engagements of a watch movement to be controlled entirely by the movements of a stem arbor which has no positive connection with the movement, and to such end my said invention consists, in a stem winding and setting watch in which the winding and setting engagements are effected by the movements of the stem arbor, substantially as and for the purpose hereinafter specified.

In illustrating my invention, such parts, only, as are necessary for an understanding of its construction and operation, will be shown and described, among which is a case-center A, that is provided with the usual pendant or stem $a$, and has within such pendant, a stem arbor B which is provided upon its outer end with an ordinary crown $b$, and has its inner, squared end $b'$ projecting into the movement space, and is adapted to be rotated and to be moved longitudinally within said pendant.

Fitted into and secured within the case-center A, is an ordinary front movement plate C, which at one edge is provided with a nearly circular notch $c$ that receives and contains a correspondingly shaped plate C′ which is secured in place thereon by screws $c'$ and $c'$. Upon the inner face of said plate C, in a line with the stem arbor B, is a cannon pinion D that is journaled within a suitable bearing $c^2$, is provided with a square axial opening which receives and contains the squared end $b'$ of said arbor, and has such diameter of its toothed portion as to cause the same to project through an opening in said plate, a sufficient distance to enable its teeth to engage with the teeth of a wheel E located upon the outer face of the same. The wheel E is journaled upon a hub $f$ that is formed upon and projects from one side of a plate F, which has the form of a disk. Said plate is pivoted at or near one edge to or upon the inner face of the plate C′, at a point opposite to and in a line axially with the cannon pinion D, while its said hub projects forward through a suitable opening $c^3$ a distance sufficient to enable it to receive and journal said wheel E. A pin G, having upon its outer end a flat head $g$, passes inward through said wheel E and hub $f$, and at its inner end is provided with a transverse opening $g'$, which receives a pin $g^2$ that operates to confine said parts together, while permitting said wheel to rotate freely, and said plate to turn with equal freedom upon its pivotal, eccentrically located bearing.

Pivoted upon the movement plate C, at one side of the plate C′ is a wheel H, which is in engagement with or forms part of a winding train, while upon the opposite side of said plate C′, is pivoted a second wheel I that has engagement with a hands setting wheel, which said wheels are so arranged as to enable the wheel E, by the movements of the pivoted plate F, to be swung into engagement with either, without disengagement from the pinion D. The slight friction of the wheel E upon its bearing, is sufficient to cause the pivoted plate F to turn upon its bearing, and to move said wheel into engagement with the wheel H when the stem arbor is rotated in one direction, and to move the same into engagement with the wheel I when said arbor is rotated in an opposite direction. In order that when thus engaged said wheel E may be prevented from being moved out of engagement by the reverse rotation of said stem arbor, there is secured upon the hub $f$, a block K which is provided with a tongue $k$ that projects radially toward the stem arbor, and has such length as to enable it to pass by the inner end of the same when the latter is drawn to the outer limit of its longitudinal motion, while when said pivoted plate is turned to the limit of its motion in either direction, and said stem arbor is pushed longitudinally inward, said tongue engages with the projecting inner end $b'$ of the latter, whenever the same is turned in an opposite direction, and thus operates as a stop or lock.

From the foregoing, it will be seen that to change the engagement of the stem arbor from winding to setting, it is only necessary to pull said arbor outward, partially rotate it in the necessary direction, and then move said arbor to the inner limit of its longitudinal motion.

When the stem driven train is in winding engagement, it is desirable, that the teeth of the wheels, E and H, should be able to move apart when the stem arbor is rotated backward, so as to produce what is commonly known as a "back-ratchet" action. This result is effected by pivoting the block K upon the hub $f$, and securing upon the plate F, the tail piece $l$ of a curved spring L, which spring has its said tail piece located at one side of said block, and its free end in engagement with the opposite side of the same. As the point of contact between the free end of said spring and said block is between the pivotal bearing of the latter, and its tongue $k$, it operates to hold said block with a yielding pressure against said tail piece $l$, in its normal position, from which the winding of the watch has no tendency to move said block, but when said stem arbor is turned backward, said spring will yield sufficiently to enable the teeth of the wheels E and H to slip over each other, as described. In setting the hands, the teeth of the wheels E and I have no tendency to separate when the stem arbor is rotated in one direction, while when said arbor is rotated in an opposite direction, the block K is rigidly held, and no separation is practicable.

In the foregoing description, my invention is illustrated as applied to old watches, but in applying such invention to new watches, the mechanism will be attached directly to the front movement plate, instead of through the medium of the plate C′ and the corresponding notch in said movement plate.

Having thus described my invention, what I claim is—

1. As an improvement in stem winding and setting watches, a watch in which the engagements of the winding and setting mechanism may be changed by a partial rotation of the stem arbor, substantially as and for the purpose specified.

2. As an improvement in stem winding and setting watches, a watch in which the winding and hands setting train is adapted to have its engagements changed by a partial rotation of the stem arbor, and to be locked in and released from such engagements by a longitudinal movement of such arbor, substantially as and for the purpose shown.

3. As an improvement in stem winding and setting watches, a watch in which the stem arbor has no positive connection with the movement, and the winding and hands setting train is adapted to have its engagement changed by the partial rotation of such arbor, substantially as and for the purpose set forth.

4. As an improvement in stem winding and setting watches, a watch in which the winding and hands setting train is adapted to have its engagements changed and to be locked in and released from such engagements by the partial rotation and the longitudinal movements of a stem arbor that has no positive connection with the movement, substantially as and for the purpose shown and described.

5. As an improvement in stem winding and setting watches, the combination of a rotatable, longitudinally movable stem arbor, a wheel driven thereby, which is adapted to engage with the winding wheel or the dial wheels, and to have such engagement changed by the rotation of such arbor, and a lock that operates to hold said stem driven wheel in engagement, substantially as and for the purpose specified.

6. As an improvement in stem winding and setting watches, the combination of a rotatable, longitudinally movable stem arbor, a wheel driven thereby which is adapted to be engaged with the winding wheel or the dial wheels by the rotation of such arbor, and a locking device that holds said wheel in engagement and is actuated by the longitudinal movements of said arbor, substantially as and for the purpose shown.

7. As an improvement in stem winding and setting watches, in combination with the winding wheel and the dial wheels thereof, a stem driven, shiftable wheel which is adapted to be engaged with either of said wheels, and a stem arbor that, by rotation, is adapted to change the engagement of such shiftable wheel and by a longitudinal movement, to lock the same in and to unlock it from engagement, substantially as and for the purpose set forth.

8. As an improvement in stem winding and setting watches, the combination of a rotatable, longitudinally movable stem arbor, a stem driven wheel which is arranged between and adapted to be moved into engagement with either the winding wheel, or the dial wheels by the rotation of the stem arbor, and a shiftable plate that journals such intermediate wheel and co-operates with said stem arbor to lock in or release said wheel from winding or setting engagement, substantially as and for the purpose shown and described.

9. As an improvement in stem winding and setting watches, the combination of a rotatable, longitudinally movable stem arbor, an intermediate stem driven wheel which is adapted to be moved into winding engagement or setting engagement by the rotation of such arbor, and means, substantially as shown, whereby said intermediate wheel may be locked fixedly in setting engagement and yieldingly in winding engagement, substantially as and for the purpose specified.

10. As an improvement in stem winding and setting watches, the combination of a rotatable, longitudinally movable stem arbor, an intermediate wheel which is driven thereby, is pivoted upon a shiftable plate and by the rotation of said arbor, is adapted to be moved into engagement with the dial wheels, or the winding wheel, and a spring-pressed stop upon said plate, adapted to co-operate with said stem-arbor, and to hold said intermediate wheel fixedly in setting engagement and yieldingly in winding engagement, substantially as and for the purpose shown.

11. As an improvement in stem winding and setting watches, the combination of a rotatable, longitudinally movable, stem-arbor, a pinion adapted to be rotated by said arbor, and through which the same may be moved longitudinally, an eccentrically pivoted, swinging plate, a wheel that is journaled upon such plate, is in engagement with said pinion, and, by the movements thereof is adapted to be engaged with the dial wheels or the winding wheel, a block which is pivoted upon such plate, and has a fixed limit of independent motion in one direction, and a spring that is secured upon said plate and engages with and holds said block with a yielding pressure at such limit of motion, whereby when said intermediate wheel is in engagement with the dial wheels and said stem arbor is at the inner limit of its longitudinal motion such engagement will be fixed, and when similarly engaged with the winding wheel, it will be held therein yieldingly, substantially as and for the purpose set forth.

In testimony whereof I hereunto set my hand this 6th day of January, A. D. 1893.

EDWIN H. FLINT.

Witnesses:

GEO. S. PRINDLE,

GEO. H. HIGH.